Feb. 1, 1927.  R. ESNAULT-PELTERIE  1,616,310
PISTON PACKING CAPABLE OF RESISTING TO A HIGH TEMPERATURE
Filed Feb. 8, 1923   2 Sheets-Sheet 1

Robert Esnault-Pelterie INVENTOR
BY HIS ATTORNEYS
Fish, Richardson & Neave

Feb. 1, 1927.
R. ESNAULT-PELTERIE
1,616,310
PISTON PACKING CAPABLE OF RESISTING TO A HIGH TEMPERATURE
Filed Feb. 8, 1923
2 Sheets-Sheet 2
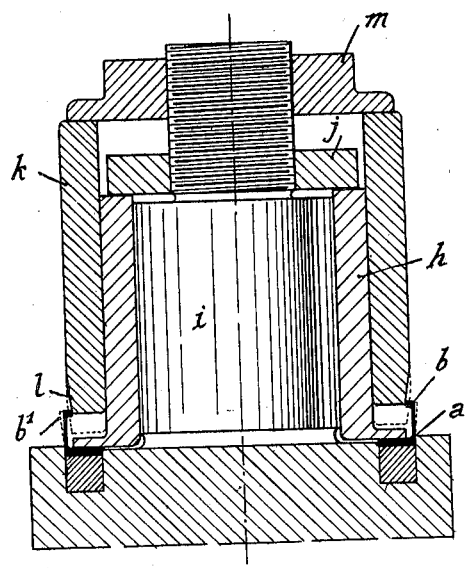
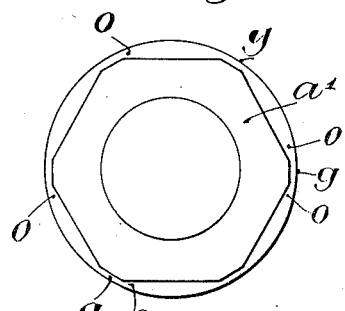
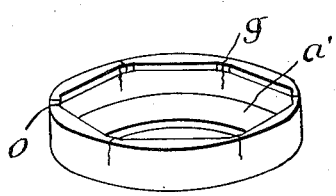
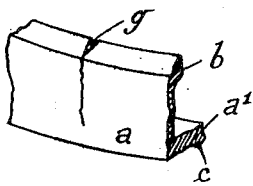
Robert Esnault-Pelterie INVENTOR
BY HIS ATTORNEYS
Fish, Richardson & Neave Patented Feb. 1, 1927.

1,616,310

UNITED STATES PATENT OFFICE.

ROBERT ESNAULT-PELTERIE, OF PARIS, FRANCE.

PISTON PACKING CAPABLE OF RESISTING TO A HIGH TEMPERATURE.

Application filed February 8, 1923, Serial No. 617,719, and in France March 4, 1922.

It is a long time since the tight-joint of of the pistons is obtained by means of a leather-packing, in the compressors, pumps or motors operated by fluids or gases, in which the temperature remains near that of the surrounding air.

It is also a long time since trials have been made in using similar metallic devices in connection with explosion engines or other apparatuses which work at a high temperature.

One of the oldest applications of this kind was limited to the idea of substituting metal for the leather, which is a soft material, and if, theoretically, this system is capable of working conveniently under high pressures, there is no doubt that, practically, unless a somewhat powerful fastening or clamping is secured in the cylinder, it may likely happen that it will not adapt itself, that is to say that the fluid to be compressed can escape quickly enough between the packing or joint and the cylinder, so that the initial excess of pressure which is necessary to apply said packing against the cylinder may not be reached.

Moreover, as this packing was entirely connected with the piston, which must have a diameter of some tenths of millimeters smaller than that of the cylinder while the packing must match exactly, it resulted therefrom that in the case of a motor (selected solely by way of example for the present explanation) and if it is admitted that the first explosion takes place correctly, a lateral stress is produced and the same by acting upon the packing instead of acting upon the piston body distorts the former and, as soon as the second explosion takes place, the tightness is lost.

The metallic segments, usually employed in thermic engines, are on the contrary, automatically centered in the cylinder and free transversely with reference to the piston; they are therefore protected against any lateral strain and this is the reason for which they have been for a very long time the only ones which can have been used in connection with said thermic motors. But the requirements of tightness have made it necessary to increase either their number or their clamping, or both at same time, according to the maximum pressure; whereas they exert a constant friction upon the cylinder, the work they absorb in pure loss increases in proportion to this maximum pressure, and therefore much more rapidly than the useful work. With somewhat high pressures, they become unserviceable.

The disadvantages have induced certain inventors to come back to the idea of the metallic packing of same shape as the leather-packing while trying to avoid the other above-mentioned difficulty. To this purpose it has been proposed, on the one hand, to cut or part this packing or joint at a predetermined place and, on the other hand, to leave to the same, in the same way as for a segment, a transverse play or slack on the piston. In order to avoid the distortions of the packing, it has also been proposed to keep the same open by means of a small segment.

This system has in the practice, proved that it could operate, but only at very moderate pressures; should it be desired for example to build engines with an explosion pressure between 35 and 50 kilogs, this system would be absolutely useless. It has furthermore a serious disadvantage: while the run of the engine is progressing, the packing wears out on its external face and in order to secure the resulting increase of diameter, the slit which is provided at a point will forcibly open itself to an extent which is equal to $2\pi\omega$ the wearing; that is to say that if the packing or joint wears $\frac{5}{10}$ of a millimeter, which is quite small, the slit opens according to about $\frac{8}{10}$, thereby causing at once an inadmissible leakage. It is therefore necessary to constantly replace these packings by new ones.

The present invention has for its object a system allowing to obtain with metal a packing offering all the advantages of a leather packing, without showing the disadvantages of the above mentioned systems.

Figure 6:
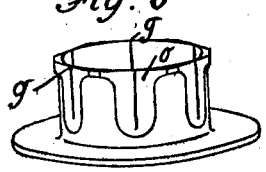
Fig. 6 is an external view of a packing of this kind constructed so as to work upon a piston rod or upon a plunger.

Fig. 6$^b$ is a perspective view of packing for a piston.

Figure 7:
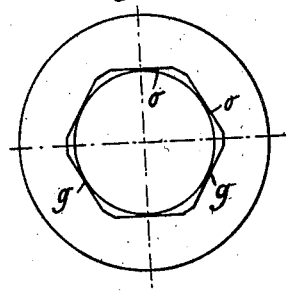

Fig. 7 is a plan view of Fig. 6.

Fig. 7$^b$ is a plan view of Fig. 6$^b$.

Figure 8:
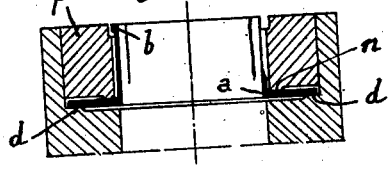

Fig. 8 is a section of the packing shewn in Fig. 6 mounted upon the part which carries it.

Figure 1:
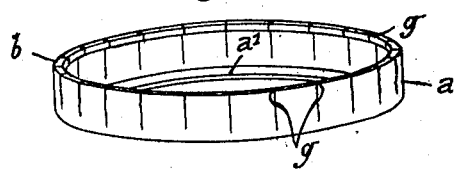
Fig. 1 is an external view of a packing of this kind arranged so as to be able to operate in a cylinder.

Fig. 9 is a view on a larger scale showing one of the torn away parts of the packing according to Fig. 1.

Fig. 10 is a view of an apparatus allowing to produce the said torn away parts.

Figure 2:
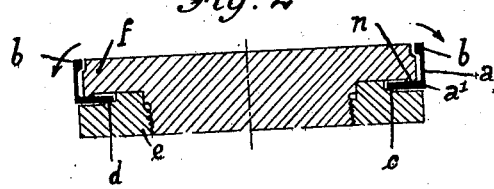
Fig. 2 is a section of the said packing, showing how the same is connected with the piston which carries it.

The packing or joint, such as it can be used for example in connection with the piston of explosion engines and such as it is represented in Figs. 1 and 2, is composed of a metallic ring which has the usual section of leather-packings, that is to say, it comprises a tubular part $a$ and an annular bearing $a^1$. Its upper edge $b$ can advantageously be provided with an overthickness which allows the same to more exactly retain its cylindrical form.

Figure 3:
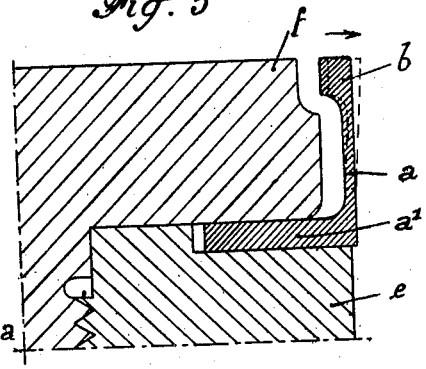
Figs. 3, 4 and 5 show, on a larger scale, three manners of mounting the packing, in these figures, the distortions of the packing have been exaggerated in order to better show and make understood how they take place.
Figure 4:
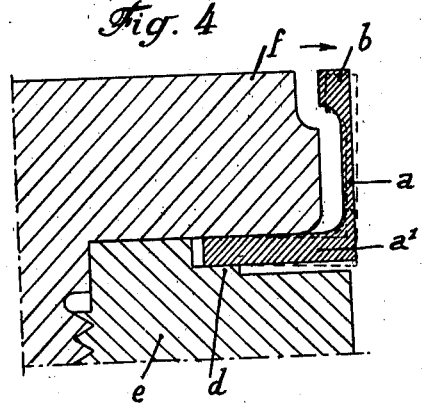

The lower face $c$ of said packing is ground, either by its whole surface (Fig. 3) or more advantageously by its inner edge over an annular bearing $d$ connected with the piston $e$ (Fig. 4). The tubular or cylindrical part $a$ of the packing is, as shewn in Fig. 1, cut or parted in numerous places, which constitutes an essential feature of the invention, from the edge $b$ and until near the lower part in order to digitate, so to say, the cylindrical part and allow the same to open in abutting against the cylinder. However, the ring $a^1$ shows no split.

These splits must exist in a very large number so that, in virtue of the opening of the packing under the influence of pressure, and even when the same begins to be worn out, the opening of each split will be exceedingly small and it will be realized that the pressure which is transmitted between the cylindrical part $a$ and the head $f$ of the piston will produce the opening or splitting of the packing, as shewn in Fig. 2, the digitated part of which bears with power against the cylinder and thus insures a perfectly tight joint. Moreover, as soon as the pressure reaches the upper face of the inner crown $a^1$ of the packing, it will act upon the whole of this surface of the crown, in order to apply the same upon its seat. In case the bearing takes place, as shewn in Figs. 2 and 4, only through the internal edge of the packing, the whole of its plane annular face will yield in the same way as a Belleville washer, and in this motion, the whole of the packing tends to open in rotating about itself in the direction of the arrows of Figs. 2 and 4, its edge $b$ tending to bear energetically against the cylinder. This opening or splitting of the packing is made possible by virtue of the numerous splits provided in the edge $b$, without running the risk of the above mentioned disadvantage of the complete cutting or parting of the packing at any place.

It will be understood that in case this last mounting is adopted the pressure exerted upon the upper face of the annular edge $a^1$ of the packing will act to start the tightness, by virtue of the bending of said plane annular face $a^1$, in the same manner as a Belleville washer.

Figure 5:
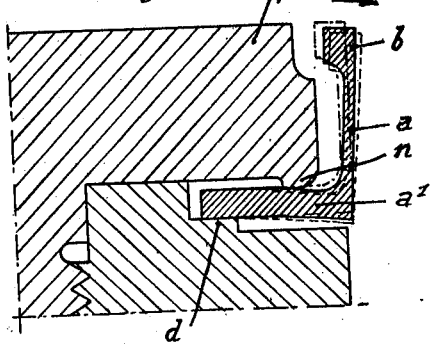

It is possible to still more favorize the starting of the tightness in using the way of mounting shewn in Fig. 5, which corresponds to a view on a larger scale shewn in Fig. 2. As shewn, the packing is in this case maintained in position by an annular flange $n$ of the cap or head $f$ of the piston, which flange bears against the external part of the flat ring $a^1$ constituting the base or bottom part of the packing. It will be observed that the action of the flange $n$, combined with that of the flange $d$, gives to the flat ring $a^1$ constituting the base of the packing or joint a conical initial strip (in the manner of a Belleville washer); this initial strip or band tends to cause the packing to open in the direction of the arrow (Fig. 5) the digitated edge $b$ passing from the position indicated in lines formed of dots and dashes to the position indicated by full lines, that is to say that the edge $b$ is urged against the wall of the cylinder. The clamping effected through the flanges $d$ and $n$ insure an initial tightness of the lower face of the ring $a^1$ against the flange $d$.

The packing or joint could of course be obtained in giving to the part $a$ a conical shape, in boring in this conical part some angular openings and in bringing back the fingers thus formed to the cylindrical position corresponding to Fig. 1. Anyhow the applicant has found out a process of manufacture which gives a far better tight-joint and which consists in making the packing if not exactly to its final sizes at least to its shape, after which cuttings $g$, which are shewn in Fig. 1, and on a larger scale on Fig. 9, are made on the inner face of the cylindrical part, the packing being then placed in the apparatus shewn in Fig. 10. As shewn in this figure, it is maintained in position by means of the part $h$ sliding exactly upon the axis $i$ and secured by the nut $j$, after which another cylindrical part $k$, the lower part of which forms a male cone $l$, which is strongly elongated or extended and slides exactly upon the part $h$, is pushed forwards through the nut $m$ or any other means. Under these conditions, it will be understood that when the part $k$ has been brought down to the position shewn in dotted lines, the edge $b$ of the packing has been caused to open or part, through the cone $l$, according to the dotted lines $b^1$, and as the cuttings *g* have formed the required number of weak points on said crown *b*, these weak points have been torn away, as shewn in Figures 1 and 9.

It is easy to understand that these irregular cuttings presenting a rough surface are much more advantageous with reference to the tightness than if the packing was made according to the above indicated process and provided with slits which are very smooth and between which the gases might escape in rectilinear jets instead of being broken a very large number of times.

The present packing possesses, like a segment, a certain freedom of motion transversely to the piston, so that, notwithstanding the play which the same can have in the cylinder, while the packing has none, it cannot receive from the said piston any lateral strain or stress.

In order to construct similar packings, acting conveniently upon a piston rod or plunger, the same system can of course be easily carried out into practice, but it must be provided for that the slits of torn away parts cannot be devised exactly in the same manner as in the previous case. In fact, after the packing has been put in place, the lips of the slits must be slightly moved apart at their end, so that they can be brought closer together under the action of the pressure which is exerted upon the external face of the packing and causes the latter to bear against the piston rod. Moreover when the packing is about to wear out, the slits will tend more to close instead of opening and, then in order to allow the closing together of the packing, it is necessary to put every one of them at the center of a thinned part *o* as shewn in Figures 6 and 7, so that the metal will have over a sufficient length a weak section, that it will be submitted to a tangential pressure which is greater than its limit of elasticity and will thus gradually shrink in proportion to its wearing out.

It is obvious that the slits *g* must be obtained by a cutting or parting similar to the one shewn in Fig. 9 and before the working of the flat portions *o*, because if such was not the case, the parting or cutting would not take place or would do it at any place of the face *o*.

The packing is maintained in the cylinder exactly in the same manner as the previous one, except however that the internal and external parts are naturally and necessarily reversed. The letters which denote them on said Figure 4 are the same as those of Figure 2 with reference to the operation of each of these parts and not to the position thereof.

In Fig. 7b, I have shown a modified form of my piston packing which, like the packing for the piston rod or plunger shown in Figs. 6 and 7, is provided with parts *o* of reduced thickness, the tears *g* being located in the middle of the said thinned areas.

This packing or joint can be made of bronze, aluminium bronze, brass, cast iron or any other metal or alloy which is the most suitable for every particular case.

What I claim is:

1. A metallic packing for piston, so arranged as to be able to operate as a leather-packing, comprising an annular flange for securing the same to the piston and a cylindrical part provided with slits according to its generating-lines, said slits having irregular and sinuous walls and adapted to bear against the cylinder-wall under the action of pressure.

2. A metallic packing for piston, so arranged as to be able to operate as a leather packing, comprising an annular flange for securing the same to the piston and a cylindrical part provided with slits according to its generating lines, said slits having irregular and sinuous walls, a circular rib provided on the edge of the cylindrical portion.

3. A metallic packing for piston, so arranged as to be able to operate as a leather-packing, comprising an annular flange for securing the same to the piston and a cylindrical part provided with slits according to its generating lines, said slits having irregular and sinuous walls, and adapted to bear against the cylinder-wall under the action of pressure, and means provided so as to put the packing in position upon the piston in determining a distortion of the packing which facilitates the starting of tightness.

4. A mode of securing a metallic packing for piston, so arranged as to be able to operate as a leather-packing, comprising an annular flange for securing the same to the piston and a cylindrical part provided with slits according to its generating-lines, said slits having irregular and sinuous walls and adapted to bear against the cylinder-wall under the action of pressure, consisting in clamping the annular flange between the piston body and the piston head to provide on the piston body below the annular flange an opening which permits said annular flange to be bent by torsion about the portion of the annular part which is imbedded in the piston head and the piston body and consequently to apply the cylindrical part of the packing against the wall of the cylinder.

5. A mode of securing a metallic packing for piston, so arranged as to be able to operate as a leather-packing, comprising an annular flange for securing the same to the piston and a cylindrical part provided with slits according to its generating-lines, said slits having irregular and sinuous walls, and adapted to bear against the cylinder-wall under the action of pressure, and in providing upon the face of the piston head an annular rib which bears against the packing whereby the cylindrical part of the packing is applied against the wall of the cylinder.

6. A metallic packing for piston, so arranged as to be able to operate as a leather-packing, comprising an annular flange for securing the same to the piston and a cylindrical part, thinned zones or areas on said cylindrical portion, the said thinned surfaces being provided with slits made according to the generating-lines of the cylinder.

In testimony whereof I have signed this specification.

ROBERT ESNAULT-PELTERIE.